United States Patent

Alam

(10) Patent No.: US 10,361,967 B2
(45) Date of Patent: Jul. 23, 2019

(54) COMMUNICATION SYSTEM USING AUDIO VIDEO BRIDGING

(71) Applicant: GM Global Technology Operations LLC, Detroit, MI (US)

(72) Inventor: Muhammad Fahad Alam, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 952 days.

(21) Appl. No.: 14/489,091

(22) Filed: Sep. 17, 2014

(65) Prior Publication Data

US 2016/0080283 A1    Mar. 17, 2016

(51) Int. Cl.

| | |
|---|---|
| *H04L 12/26* | (2006.01) |
| *H04L 12/911* | (2013.01) |
| *H04B 17/373* | (2015.01) |
| *H04L 12/815* | (2013.01) |
| *H04L 12/781* | (2013.01) |
| *H04L 12/813* | (2013.01) |

(52) U.S. Cl.
CPC ........... *H04L 47/72* (2013.01); *H04B 17/373* (2015.01); *H04L 43/0888* (2013.01); *H04L 45/52* (2013.01); *H04L 47/20* (2013.01); *H04L 47/22* (2013.01)

(58) Field of Classification Search
CPC ......... H04L 2012/40273; H04L 12/569; H04L 47/72; H04L 47/76; H04L 47/788
See application file for complete search history.

(56) References Cited

U.S. PATENT DOCUMENTS

| 6,105,122 | A | * | 8/2000 | Muller | .................... | G06F 15/17 |
| | | | | | | 345/472 |
| 2008/0285981 | A1 | * | 11/2008 | Diab | ................... | H04L 12/2805 |
| | | | | | | 398/154 |
| 2012/0030341 | A1 | * | 2/2012 | Jensen | ................ | H04L 67/2804 |
| | | | | | | 709/224 |

(Continued)

OTHER PUBLICATIONS

IEEE Computer Society, "Media Access Control (MAC) Bridges and Virtual Bridged Local Area Networks" IEEE-802.1Q 2011. Aug. 31, 2005.*

*Primary Examiner* — Robert M Morlan
(74) *Attorney, Agent, or Firm* — Rising Ethington P.C.; David Willoughby

(57) ABSTRACT

A communication system and methods of using the system are described. The communication system includes: a plurality of electronic control units (ECUs) operably configured for a first protocol and a second protocol; one or more switches; a first network of connections; and a second network of connections. The first protocol may be an audio video bridging (AVB) protocol. And the ECUs may include: a first protocol interface that includes one or more AVB ports; a second protocol interface; memory storing traffic shaping instructions; and a processor configured to carry out the traffic shaping instructions. The one or more switches may have a plurality of AVB ports. The first network of connections may interconnect the ports of the plurality of ECUs and the ports of the one or more switches. And the second network of connections may interconnect the second protocol interfaces of at least some of the plurality of ECUs.

8 Claims, 3 Drawing Sheets

(56) References Cited

U.S. PATENT DOCUMENTS

2014/0222987 A1* 8/2014 Pearson .............. H04L 12/2409
709/224
2015/0332145 A1* 11/2015 Vasseur ................... G06N 5/04
706/12

* cited by examiner

US 10,361,967 B2

COMMUNICATION SYSTEM USING AUDIO VIDEO BRIDGING

TECHNICAL FIELD

The present invention relates to a communication system using audio video bridging (AVB).

BACKGROUND

Audio Video Bridging or AVB technology includes technical standards developed by the Institute of Electrical and Electronics Engineers (IEEE) Audio Video Bridging Task Group. The technology enables a switchable network for transmitting audio and video at suitably fast data rates (e.g., Fast Ethernet, Gigabit (Gbit) Ethernet, 10 Gbit Ethernet, etc.).

SUMMARY

According to an embodiment of the invention, there is provided a communication system that includes: a plurality of electronic control units (ECUs) operably configured for a first protocol and a second protocol; one or more switches; a first network of connections; and a second network of connections. The first protocol may be an audio video bridging (AVB) protocol. And the ECUs may include: a first protocol interface that includes one or more AVB ports; a second protocol interface; memory storing traffic shaping instructions; and a processor configured to carry out the traffic shaping instructions. The one or more switches may have a plurality of AVB ports. The first network of connections may interconnect the AVB ports of the plurality of ECUs and the AVB ports of the one or more switches. And the second network of connections may interconnect the second protocol interfaces of at least some of the plurality of ECUs.

According to another embodiment of the invention, there is provided a computer program product that includes a non-transitory computer readable medium for a first electronic control unit (ECU), comprising one or more software programs stored on the computer readable medium having program instructions. The program instructions may include: determining a throughput parameter associated with a reserved traffic channel operating in accordance with an audio video bridging (AVB) protocol, wherein the reserved traffic channel is between the first ECU and one or more endpoint ECUs; providing audio-video (AV) data via the reserved traffic channel using the throughput parameter; receiving an indication using the AVB protocol or a secondary protocol, different than the AVB protocol, of a change in throughput demand on the reserved traffic channel; determining a new throughput parameter based on the indication; and providing AV data via the reserved traffic channel using the new throughput parameter.

According to another embodiment of the invention, there is provided a method of shaping high priority traffic using an audio video bridging (AVB) protocol. The method includes the steps of: reserving a traffic channel having a bandwidth based on a volume of network traffic, wherein the reservation is according to the AVB protocol for communication of high priority data between a first electronic control unit (ECU) and a second ECU; providing high priority data over the reserved traffic channel; determining a change in the volume of network traffic based on data received at the first ECU via the AVB protocol or a second protocol, wherein the second protocol is different than the AVB protocol; based on the change, re-determining reserved traffic channel; and providing high priority data over the re-determined, reserved traffic channel.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

Described below is a vehicle communication system using audio video bridging (AVB) network technology. More specifically, the communication system includes two communication networks and two physical layer architectures enabling the connectivity of multiple electronic control units (ECUs) over either or both architectures. In one instance, the ECUs may communicate using an AVB protocol over one of the architectures, and the ECUs may communicate using a secondary protocol (e.g., such as a controller area network or CAN protocol) over the other architecture. The AVB network may facilitate the transmission of high priority data (e.g., audio and/or video) over one or more dedicated or reserved channels (e.g., a reserved bandwidth). And using the unreserved AVB channels or the secondary protocol (and other architecture), communication may be provided to one of the ECUs indicating a change in bandwidth demand (e.g., an ECU that is the source of the high priority data).

The source-ECU may determine a new reserved bandwidth and provide that reservation information to any ECUs associated with the transmission (e.g., downstream or endpoint-ECUs). In addition (or alternatively), the secondary protocol may be used to provide information indicating the change in bandwidth demand to the source-ECU. For example, instead of using the AVB protocol and the first architecture to provide this information, the secondary protocol (e.g., CAN protocol) and the second architecture may be used. Thus, a flexible vehicle communication system is presented that enables the uninterrupted or undelayed delivery of the high priority content data even during instances when lower priority data communications are of higher volume/usage (e.g., over the AVB network's unreserved channels). In addition, the communication system is capable of predictive bandwidth changes. According to one predictive example, if a transmission from the source-ECU is nearly complete, prior to the end of the transmission, AVB parameter data may be sent via one architecture or the other from the source-ECU to the associated endpoint-ECU—thereby enabling a seamless change in the bandwidth reservation. This predictive feature may also be used prior to a source-ECU's transmission of high priority data—thereby avoiding sudden data rate slow-downs caused by a large and sudden system demand.

Figure 1:
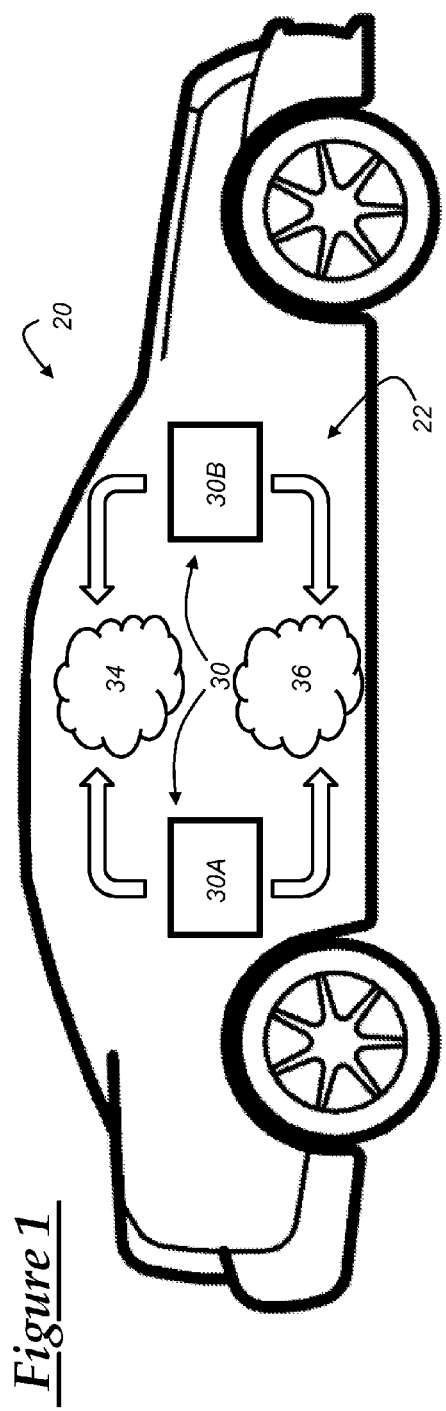
FIG. 1 is a schematic diagram depicting an embodiment of a vehicle and a vehicle communications system that is capable of utilizing the method disclosed herein.

FIG. 1 illustrates a vehicle 20 having a vehicle communication system 22 therein. The illustration shows communication system 22 including two electronic control units (ECUs) 30 (e.g., 30A, 30B), a first network architecture or an audio video bridging (AVB) architecture 34, and a second network architecture 36. The second network architecture 36 may be any other suitable architecture; e.g., any architecture capable of supporting a controller area network (CAN), a media oriented systems transport (MOST), a local interconnect network (LIN), a local area network (LAN), or a proprietary network, just to name a few examples. Thus, according to one embodiment, the AVB architecture may use Ethernet; however, as AVB technology may evolve and use other architectures, these technologies are contemplated also. The secondary network architecture may utilize any suitable serial or parallel communication means (e.g., a data bus).

Figure 2:
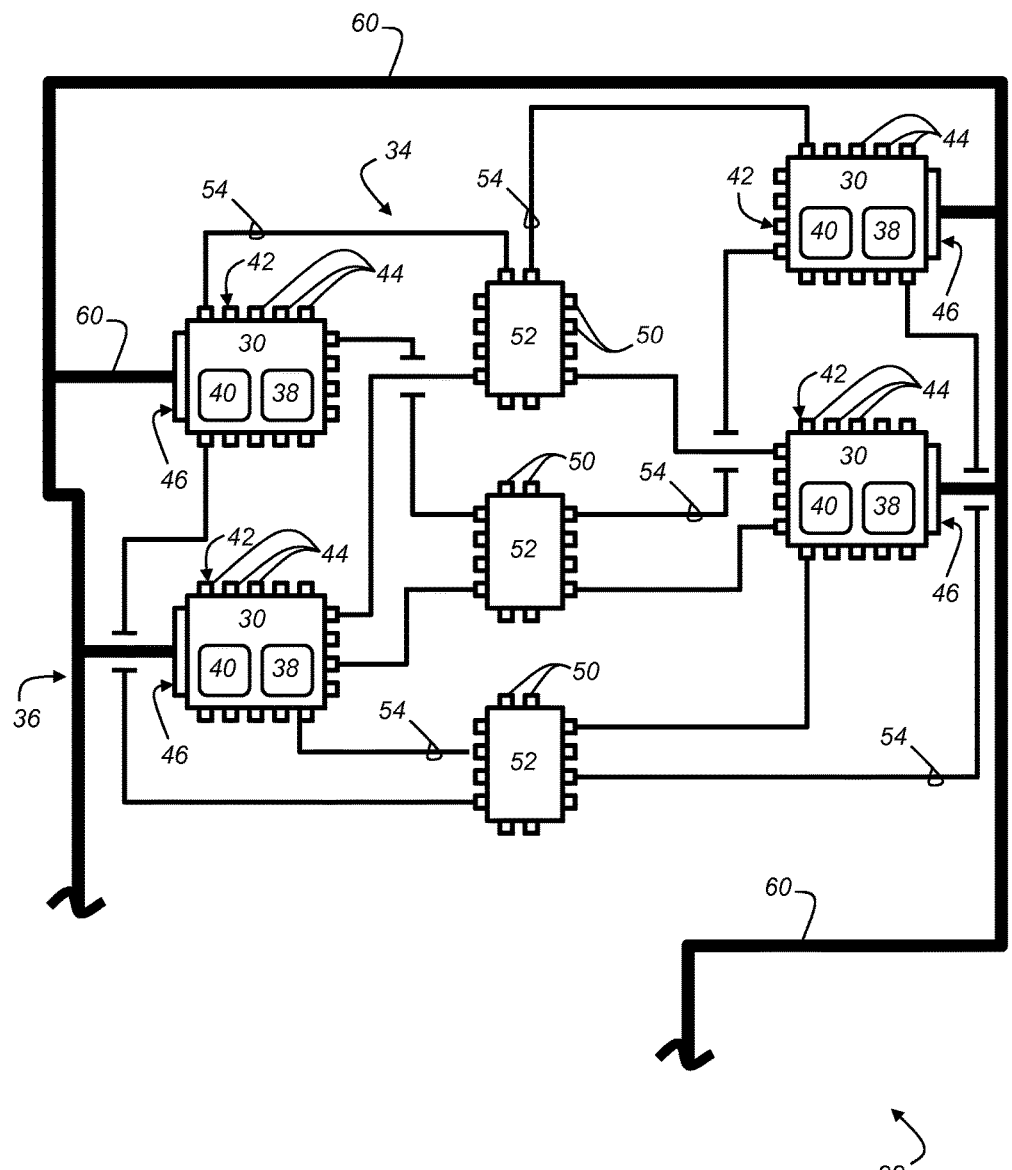
FIG. 2 is a detailed diagram of the vehicle communications system shown in FIG. 1.

FIG. 2 is a more detailed view of the communication system 22. Here, four ECUs 30 are shown; however, it will be appreciated that any suitable number of ECUs may be used. Each of the ECUs 30 include both one or more processors 38 and memory 40. In addition, the illustrated ECUs include both a first protocol interface or an AVB interface 42 having multiple ports 44 and a second protocol interface 46 (e.g., compatible to the second network architecture 36).

Processors 38 can be any type of device capable of processing electronic instructions including microprocessors, microcontrollers, host processors, controllers, vehicle communication processors, and application specific integrated circuits (ASICs). In at least one embodiment, they are dedicated processor(s) used only for the respective ECU 30. Processors 38 may be configured to execute various types of digitally-stored instructions, such as software or firmware programs stored in memory 40, which enable the respective ECU to provide a wide variety of services. For instance, processors 38 can execute programs or process data to transmit audio and/or video and carry out at least a part of the method discussed herein.

Memory 40 may be any suitable non-transitory computer usable or readable medium. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. Memory 40 may store one or more computer programs executable by the processor(s) 38 to cause the communication system 22 to perform the methods described herein. Computer program(s) may exist in a variety of forms—both active and inactive. For example, the computer program(s) can exist as software program(s) comprised of program instructions in source code, object code, executable code or other formats; firmware program(s); or hardware description language (HDL) files.

The AVB and second protocol interfaces 42, 46 (as well as the ports 44) will be identifiable to skilled artisans—as well as the techniques for coupling and using such interfaces.

As previously discussed, the ECUs 30 may be shared by both the AVB architecture 34 and the second network architecture 36. In the AVB architecture 34, the ECUs 30 are coupled to ports 50 of one or more switches or switching elements 52 via multiple first network connections 54. The switches 52 may be any suitable device for routing data between ECUs 30. And the network connections 54 may be any suitable wire, cable, etc. (e.g., an Ethernet cable). In addition, according to the AVB architecture, the ECUs 30, the ports 44 (on the ECUs), the network connections 54, the switches 52, and the ports 50 (on the switches) may all be compatible with AVB technology. As will be explained in greater detail below, one ECU 30 may be a source-ECU or a talker-ECU commanding or instructing other ECUs 30 that are sink-ECUs (also known as endpoint-ECUs or listener-ECUs); and skilled artisans will appreciate that the source-ECU, the sink-ECUs, and the connective devices therebetween (ports 44, ports 50, connections 54, etc.) must all be AVB compliant. In addition, in some embodiments, one ECU may be the source-ECU for a time and act as a sink-ECU at other times. Likewise, sink-ECUs in some circumstances may be source-ECUs in other circumstances.

The second network architecture 36 shares the ECUs 30 previously described. The second protocol interfaces 46 of each of the ECUs 30 are shown coupling the ECUs to a second network connection 60. Here, the second network connection 60 may be a serial bus; however, other examples are possible.

Figure 3:
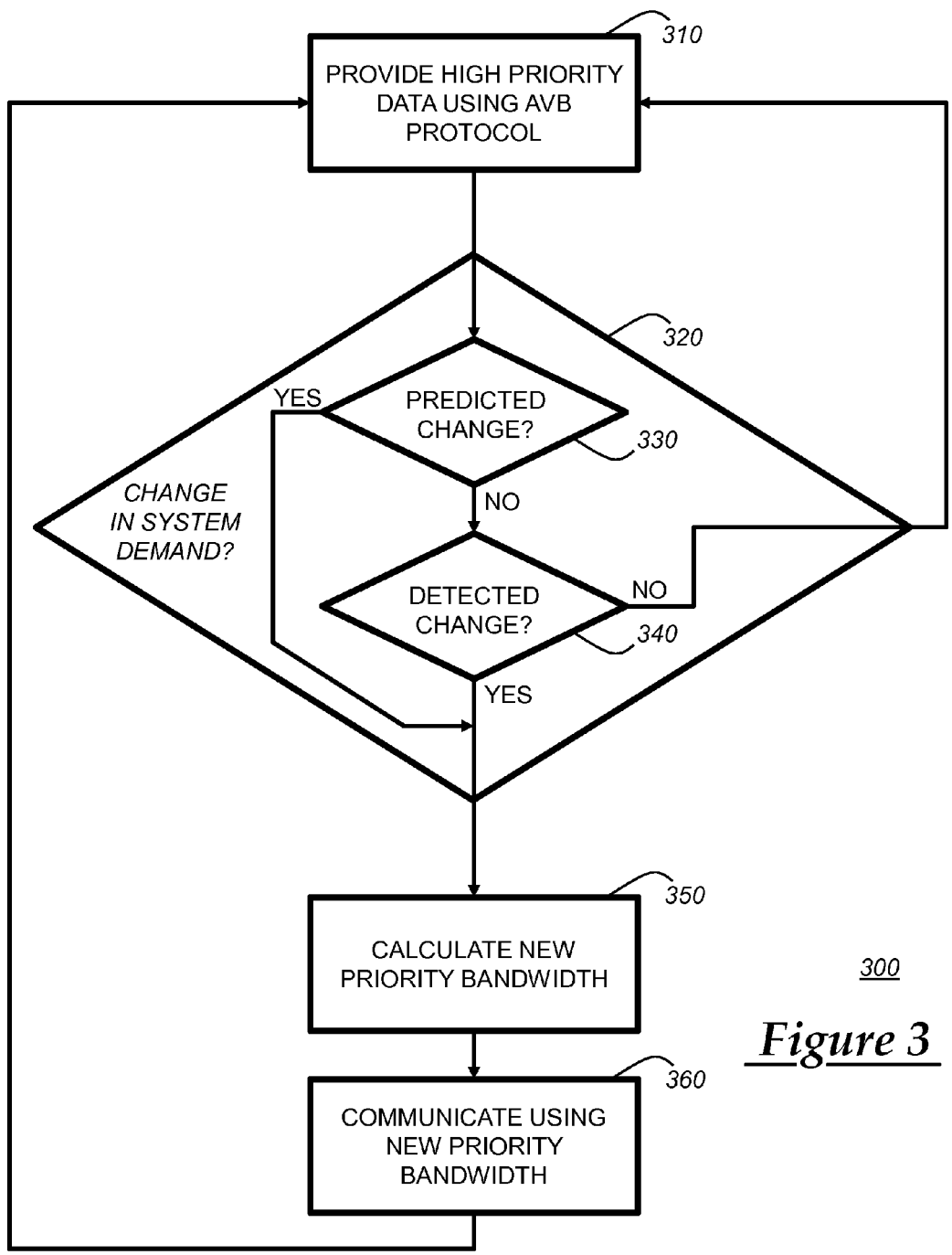
FIG. 3 is a flow diagram illustrating a method of using the communications system.

FIG. 3 illustrates a method 300 of using the ECUs 30 which are shared by both the AVB and second network architectures 24, 26.

Figure 4:
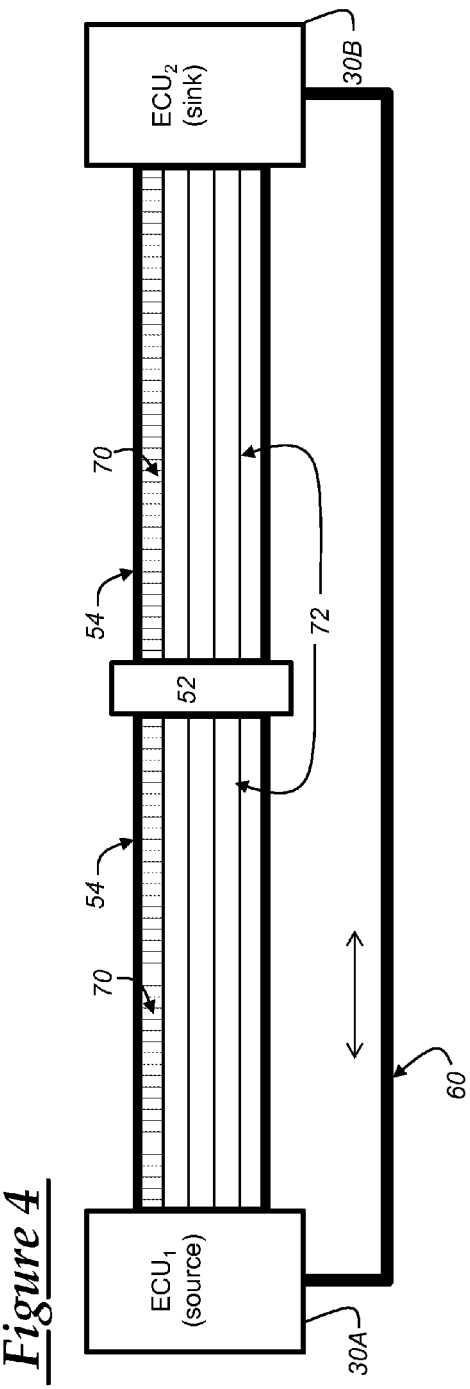
FIG. 4 is a schematic diagram of a talker electronic control unit (talker-ECU) connected to a listener-ECU.

The method begins with step 310—providing high priority data using the AVB protocol and the AVB architecture 34. This step includes a source-ECU setting or determining one or more throughput parameters (e.g., one or more high priority or reserved channels, one or more unreserved channels (e.g., for lower priority data), data rates for both reserved and unreserved channels, etc.)—and also providing the one or more parameters to the sink-ECUs and the associated switches 52. FIG. 4 schematically illustrates the source-ECU (ECU 30A), one of the sink-ECUs 30 (ECU 30B), the Ethernet connection 54, a reserved channel 70, and a several unreserved channels 72. Thus, in step 310, once the source-ECU determines and provides the parameter(s), high priority content data (such as audio and/or video data) may be conveyed from the source-ECU (30A) to the sink-ECU 30 (30B) over the reserved channel 70.

Returning to FIG. 3, the method may proceed to step 320 where it is determined whether a change in system demand has occurred or will occur (e.g., in the near future). In one embodiment, the source-ECU (30A) receives an indication using the AVB protocol or a secondary protocol of a change in throughput demand. This may be determined by the source-ECU or provided by another ECU (including one of the sink-ECUs). Thus, when the indication is determined by another ECU 30, this information may be provided via bus 60 or via Ethernet 54 (e.g., via one of the unreserved channels 72).

As shown in FIG. 3, step 320 may have sub-steps 330 and/or 340. In sub-step 330, it may be determined whether a predicted or forecasted change in throughput demand may occur (e.g., in the near future). In one embodiment, the source-ECU may determine that a change in bandwidth demand is about to occur. For example, if the source-ECU is currently streaming a movie, the source-ECU may be capable of determining a time value (t) associated with the end of the movie and thus a sudden decrease in throughput demand. Or for example, if the source-ECU is about to stream a movie in t seconds, then the source-ECU may be capable of predicting when the bandwidth demand will suddenly increase. Likewise, other ECUs may be aware of the initiation or termination of other data desirable to transmit via a reserved channel (such as channel 70), e.g., while other source-ECUs are providing content data. If a change is predicted in sub-step 330, then the method proceeds to step 350; otherwise, the method 300 may proceed to sub-step 340.

In sub-step 340, the method determines whether a change in bandwidth has occurred. For example, in some instances, the change in throughput demand may not be predicted or predictable. Thus, in one implementation, step 320 enables a reactive or responsive feature so that if the bandwidth changes suddenly or without notice, the ECUs 30 may add or subtract the size and/or number of reserved channels 70. If the change is detected in sub-step 340, then the method proceeds to step 350; otherwise, the method 300 may proceed to step 310 again and continue to provide high priority content data as previously described.

In step 350—having either predicted and/or detected the change in throughput demand—the method may determine or calculate a new priority bandwidth. This may require adding or subtracting reserved channels 70 or even adjusting the bandwidth associated with each channel. Following step 350, the method proceeds to step 360.

In step 360, the method 300 communicates using the new bandwidth priority to the other AVB compatible ECUs—e.g., to the sink-ECUs receiving high priority content data. For example, the source-ECU may provide or command the other associated ECUs 30 to size and configure the reserved channel(s) 70.

According to another embodiment, the method 300 could determine both a predicted change in bandwidth in sub-step 330 and a detected change in bandwidth in sub-step 340. Thus for example, if a predicted change occurs in sub-step 330, instead of proceeding directly to step 350, the method 300 may proceed to sub-step 340 and determine whether a detected change has also occurred. Thus, if either sub-step 330 or 340 are TRUE, the method may proceed to step 350.

According to another embodiment, the ECUs 30 may be coupled to one or more other ECUs via switch(es) 52. For example, in FIG. 2 each ECU is shown coupled to each of the other ECUs 30 (via each switches 52). This is merely an example, and other implementations are possible.

The foregoing communication system (22) has been described in the context of a vehicle-environment. The vehicle 20 could be any suitable land-, water-, air-vehicle. And the automobile illustrated in FIG. 1 is merely an example; other environments are possible. For example, the communication system could be in a home or office environment, or any other suitable environment.

In addition as discussed above, the communication system 22 may be implemented on a computer program product. The computer program product may include a non-transitory computer readable medium for one or more ECUs 30, comprising one or more software programs stored on the computer readable medium having program instructions. And the ECU(s) may perform one or more steps of the methods disclosed herein when executing the program instructions. For example, the steps may include: determining a throughput parameter associated with a reserved traffic channel operating in accordance with the AVB protocol and the reserved traffic channel may be between the source-ECU and one or more sink-ECUs; providing audio-video (AV) content data via the reserved traffic channel using the throughput parameter; receiving an indication using the AVB protocol (and AVB architecture 34) or the secondary protocol (and secondary architecture 36) of a change in bandwidth or throughput demand on the reserved traffic channel; determining a new throughput parameter based on the indication; and providing AV data via the reserved traffic channel using the new throughput parameter.

Thus, there has been disclosed several implementation of a communication system that comprises both an AVB architecture and a secondary architecture—both architectures sharing multiple ECUs. According to an AVB protocol, channels may be reserved for high priority traffic on the AVB architecture. The remaining traffic channels—whether these are over the AVB architecture or the secondary architecture—may be used shape other traffic, including providing advance information regarding future or immediate changes in the reserved channel(s).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:
1. A communication system, comprising:
a plurality of electronic control units (ECUs) operably configured for a first protocol and a second protocol, wherein the first protocol is an audio video bridging (AVB) protocol, wherein the plurality of ECUs comprise:
a first protocol interface that includes one or more AVB ports;
a second protocol interface;
memory storing traffic shaping instructions; and
a processor configured to carry out the traffic shaping instructions;
one or more switches, the one or more switches having a plurality of AVB ports;
a first network of connections interconnecting the AVB ports of the plurality of ECUs and the AVB ports of the one or more switches; and
a second network of connections interconnecting the second protocol interfaces of at least some of the plurality of ECUs;
wherein, when the processor of a first one of the plurality of ECUs is executed, the traffic shaping instructions cause the processor to:
receive a change in a throughput parameter from a second one of the plurality of ECUs over the second protocol, wherein the change in throughput parameter is associated with high priority data communicated over the first network between the first one and the second one of the plurality of ECUs;
based on the change, calculate a new throughput parameter for the first network; and communicate the high priority data with the second one of the plurality of ECUs according to the new throughput parameter over the first network.

2. The communication system of claim 1, wherein, when executed by the processor, the traffic shaping instructions cause the processor to monitor data traffic on the first network.

3. The communication system of claim 2, wherein the determining step includes: forecasting the change in priority bandwidth, detecting and then responding to the change, or both.

4. The communication system of claim 2, further comprising repeating the determining step, the calculating step, and the communicating step based upon system demand.

5. The communication system of claim 1, wherein the secondary protocol is: a controller area network (CAN), a media oriented systems transport (MOST), a local interconnect network (LIN), a local area network (LAN), or a proprietary network.

6. A method of shaping high priority traffic using an audio video bridging (AVB) protocol, comprising the steps of:
reserving a traffic channel having a bandwidth based on a volume of network traffic, wherein the reservation is according to the AVB protocol for communication of high priority data between a first electronic control unit (ECU) and a second ECU, wherein the first ECU and the second ECU are operably configured for communications using a first protocol and a second protocol, wherein the first network interconnects one or more AVB ports of the first ECU and the second ECU, and wherein the second network interconnects the first ECU and the second ECU via second protocol interfaces of the first ECU and the second ECU;
providing high priority data over the reserved traffic channel using the first network;
receiving a change in a throughput parameter from the second ECU over the second protocol, wherein the change in throughput parameter is associated with the high priority data communicated over the reserved traffic channel between the first ECU and the second ECU;
based on the change, calculating a new throughput parameter for the first network; and
communicating the high priority data with the second ECU according to the new throughput parameter over the first network.

7. The method of claim 6, wherein the communicating step includes: providing the new throughput parameter to the second ECU and then providing the high priority data over a re-determined, reserved traffic channel.

8. The method of claim 6, wherein the calculating step includes: resizing the reserved traffic channel, adding another reserved traffic channel, or both.

* * * * *